United States Patent
Weiner et al.

(10) Patent No.: US 12,294,522 B1
(45) Date of Patent: May 6, 2025

(54) MITIGATING VOLTAGE SURGES IN A NETWORK DEVICE BY CONTROLLING PORT BANDWIDTHS

(71) Applicant: Mellanox Technologies, Ltd., Yokneam (IL)

(72) Inventors: Michael Weiner, Nes Ziona (IL); Lavi Koch, Jerusalem (IL)

(73) Assignee: Mellanox Technologies, Ltd, Yokneam (IL)

( * ) Notice: Subject to any disclaimer, the term of this patent is extended or adjusted under 35 U.S.C. 154(b) by 0 days.

(21) Appl. No.: 18/503,219

(22) Filed: Nov. 7, 2023

(51) Int. Cl.
H04L 47/25 (2022.01)
H04L 47/22 (2022.01)

(52) U.S. Cl.
CPC ............ H04L 47/225 (2013.01); H04L 47/25 (2013.01)

(58) Field of Classification Search
CPC .............................. H04L 47/225; H04L 47/25
See application file for complete search history.

(56) References Cited

U.S. PATENT DOCUMENTS

| | | | |
|---|---|---|---|
| 7,839,878 B2 | 11/2010 | Hino et al. | |
| 8,205,102 B2 | 6/2012 | Kabbara et al. | |
| 8,897,314 B1 | 11/2014 | Krivitski et al. | |
| 9,118,489 B2 | 8/2015 | Hayashi et al. | |
| 9,288,151 B2 | 3/2016 | Chapman et al. | |
| 10,205,683 B2 | 2/2019 | Elias et al. | |
| 10,462,632 B2 | 10/2019 | Artstain et al. | |
| 10,511,989 B2 | 12/2019 | Hsu et al. | |
| 11,159,455 B1 | 10/2021 | Matthews et al. | |
| 2012/0120958 A1 | 5/2012 | Mahadevan et al. | |
| 2012/0218896 A1 | 8/2012 | Ygberg et al. | |
| 2012/0289224 A1 | 11/2012 | Hallberg et al. | |
| 2015/0185797 A1* | 7/2015 | Cooper | G06F 1/3275 713/340 |
| 2017/0230269 A1 | 8/2017 | Kamath et al. | |
| 2023/0057068 A1* | 2/2023 | Bhandarkar | H04L 47/562 |
| 2024/0085971 A1* | 3/2024 | Cao | G06F 1/189 |

OTHER PUBLICATIONS

Kazimirsky et al., U.S. Appl. No. 18/309,842, filed May 1, 2023.

* cited by examiner

*Primary Examiner* — Suraj M Joshi
(74) *Attorney, Agent, or Firm* — Meitar Patents Ltd.; Daniel Kligler

(57) ABSTRACT

A network device includes a plurality of ports, processing circuitry, and control circuitry. The ports are to receive communication traffic from a plurality of processing devices. The processing circuitry is to process the communication traffic received via the ports. The control circuitry is to assess one or more electrical-current consumption values associated with at least the network device, and, depending on the electrical-current consumption values, to control a traffic slew-rate of the communication traffic of at least a port among the ports to remain within a specified slew-rate range, the traffic slew-rate being defined as a rate at which a bandwidth of the communication traffic received via the port changes as a function of time.

20 Claims, 2 Drawing Sheets

MITIGATING VOLTAGE SURGES IN A NETWORK DEVICE BY CONTROLLING PORT BANDWIDTHS

FIELD OF THE DISCLOSURE

The present invention relates generally to network devices, and particularly to methods and systems for mitigating voltage surges in network devices and systems that include network devices.

BACKGROUND

In the field of network devices, a constant challenge is managing voltage surges, or spikes, that can occur due to rapid changes in current consumption. These surges may be caused by sudden increases or decreases in the volume of communication traffic processed by the network device.

SUMMARY

An embodiment of the present invention that is described herein provides a network device including a plurality of ports, processing circuitry, and control circuitry. The ports are to receive communication traffic from a plurality of processing devices. The processing circuitry is to process the communication traffic received via the ports. The control circuitry is to assess one or more electrical-current consumption values associated with at least the network device, and, depending on the electrical-current consumption values, to control a traffic slew-rate of the communication traffic of at least a port among the ports to remain within a specified slew-rate range, the traffic slew-rate being defined as a rate at which a bandwidth of the communication traffic received via the port changes as a function of time.

In an embodiment, the control circuitry is to control the traffic slew-rate to remain within the specified slew-rate range, by (i) detecting that the bandwidth of the communication traffic increases more rapidly than a specified traffic slew-rate threshold, and (ii) in response, controlling the port to throttle-down the bandwidth. In a disclosed embodiment, the control circuitry is to control the traffic slew-rate to remain within the specified slew-rate range, by (i) detecting that the bandwidth of the communication traffic decreases more rapidly than a specified traffic slew-rate threshold, and (ii) in response, controlling the port to inject dummy traffic so as to throttle-up the bandwidth. The network device may further include a traffic termination circuit to receive and discard the dummy traffic.

In some embodiments, the at least one port includes multiple ports, and the control circuitry includes a centralized controller that is to control respective traffic slew-rates of the multiple ports. In alternative embodiments, the at least one port includes multiple ports, and the control circuitry includes multiple port-specific controllers associated with the multiple ports, respectively, each port-specific controller to control the traffic slew-rate of the respective port.

There is additionally provided, in accordance with an embodiment described herein, a system including a plurality of processing devices and a network device. The network device includes a plurality of ports, processing circuitry, and control circuitry. The ports are to receive communication traffic from the processing devices. The processing circuitry is to process the communication traffic received via the ports. The control circuitry is to assess one or more electrical-current consumption values associated with at least the network device, and, depending on the electrical-current consumption values, to control a traffic slew-rate of the communication traffic of at least a port among the ports to remain within a specified slew-rate range, the traffic slew-rate being defined as a rate at which a bandwidth of the communication traffic received via the port changes as a function of time.

In various embodiments, the processing devices may include at least one device type selected from a group of types consisting of a Graphics Processing Unit (GPU), a Central Processing Unit (CPU) and a Field-Programmable Gate Array (FPGA).

There is also provided, in accordance with an embodiment described herein, a method including, in a network device, receiving communication traffic from a plurality of processing devices via a plurality of ports, and processing the received communication traffic. One or more electrical-current consumption values, associated with at least the network device, are assessed. Depending on the electrical-current consumption values, a traffic slew-rate of the communication traffic of at least a port among the ports is controlled to remain within a specified slew-rate range, the traffic slew-rate being defined as a rate at which a bandwidth of the communication traffic received via the port changes as a function of time.

The present invention will be more fully understood the from the following detailed description of embodiments thereof, taken together with the drawings in which:

DETAILED DESCRIPTION OF EMBODIMENTS

Overview

Figure 1:
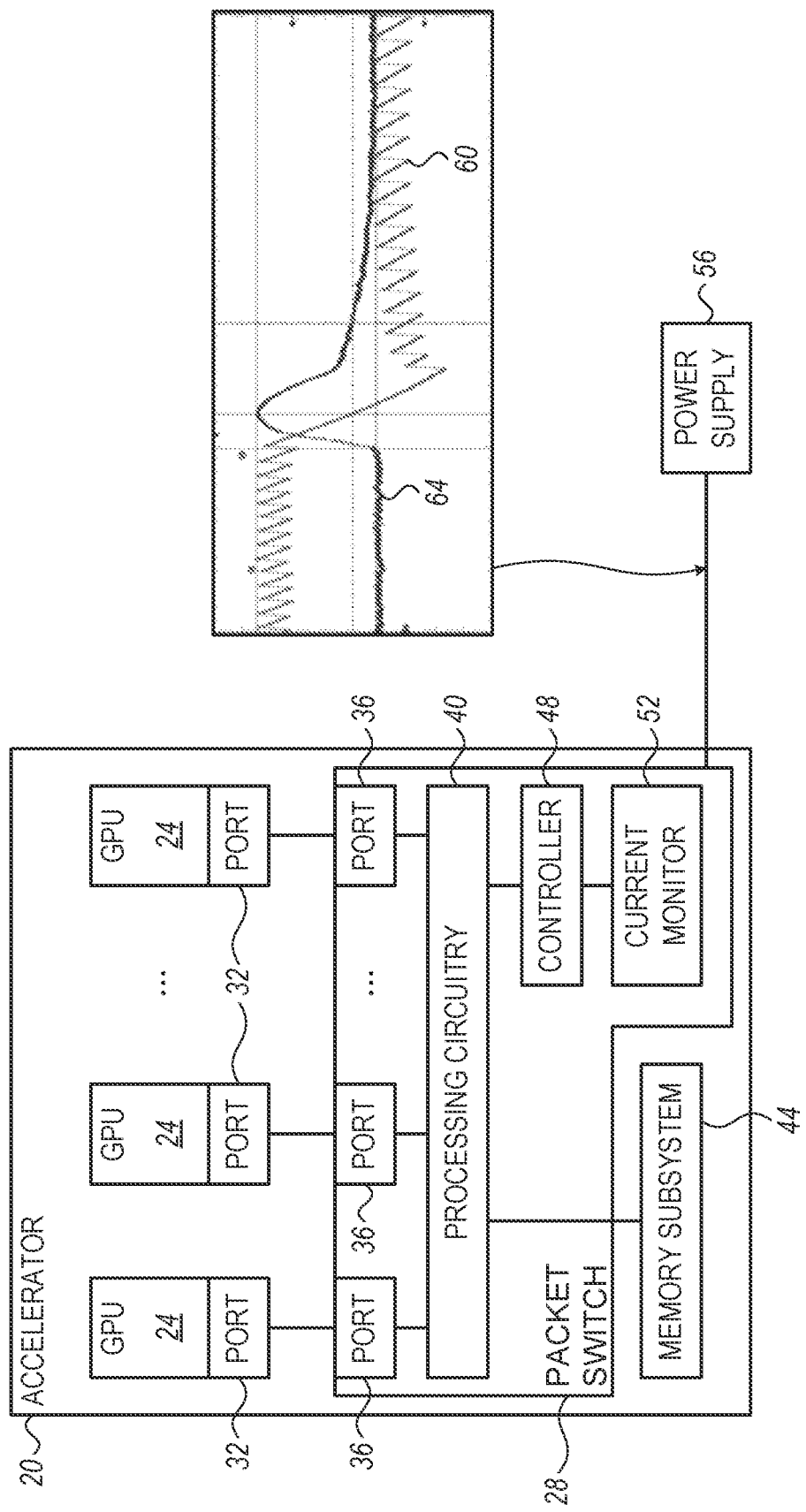
FIG. 1 is a block diagram that schematically illustrates an Artificial Intelligence (AI) accelerator that mitigates voltage surges caused by abrupt changes in current consumption, in accordance with an embodiment of the present invention.

Sudden variations in the volume of communication traffic processed by a network device can occur for various reasons. For instance, consider a network device used for connecting multiple Graphics Processing Units (GPUs) that perform Artificial Intelligence (AI) tasks. These tasks often require high computational power and can cause abrupt changes in the communication traffic, e.g., as the tasks begin and end, leading to sudden variations in electrical current consumption. The problem becomes particularly acute when the AI tasks of different GPUs are synchronized, i.e., begin and/or end together.

Consider a network device whose power-supply system has a characteristic inductance L. A rapid step-like change (drop or rise) in the current consumption i will cause a voltage surge of magnitude v, given by $v=-Ldi/dt$. As seen, the magnitude of the voltage surge is proportional to, and opposite in polarity to, the rate at which the current consumption changes.

Therefore, multiple tasks that begin simultaneously can lead to a sudden surge in communication traffic entering the network device, causing a rapid increase in current consumption and, consequently, a voltage undershoot surge. Similarly, when multiple tasks end simultaneously, a sudden drop in communication traffic may occur, leading to a rapid decrease in current consumption and a potential voltage overshoot surge. Both types of surges can potentially cause timing violations (setup-time or hold-time violations) in digital circuitry of the network device, cause damage to components of the network device, degrade its performance, or shorten its lifespan.

Embodiments of the present invention that are described herein provide network devices specifically designed to control voltage surges caused by rapid changes in current consumption. In some embodiments, a network device comprises multiple ports to receive communication traffic from various processing devices, processing circuitry to handle the received communication traffic, and control circuitry. The control circuitry is configured to evaluate electrical-current consumption values associated with the network device and, based on these values, manage a traffic slew-rate of the communication traffic of at least one port among the ports to stay within a specified slew-rate range.

In the present context, the term "traffic slew-rate of a port" is defined as the rate at which the bandwidth of the communication traffic received via the port changes as a function of time. Put in another way, the traffic slew-rate of a port is the rate at which the port's data rate changes, or the slope of the port's data rate as a function of time. The traffic slew-rate can be measured in units of Mbps/sec, or MHz/sec, for example.

The control circuitry can regulate the traffic slew-rate by detecting if the bandwidth of the communication traffic increases or decreases more rapidly than a specified traffic slew-rate threshold. In response to this detection, the control circuitry can throttle-down or throttle-up the bandwidth, respectively. This action helps to prevent sudden changes in current consumption, thereby mitigating the risk of voltage surges.

In an embodiment, upon detecting that the bandwidth of a port decreases more rapidly than the specified traffic slew-rate threshold, the network device injects "dummy traffic" to the switch port, thereby artificially limiting the rate of decrease in the port bandwidth. In the present context, the term "dummy traffic" refers to traffic (e.g., packets) that is intended only for artificially increasing the traffic bandwidth through a port and is not intended for actual processing by the network device. The device may also comprise a traffic termination circuit to receive and discard dummy traffic.

In various embodiments, the control circuitry may comprise a centralized controller and/or multiple port-specific controllers to manage the traffic slew-rates of multiple ports.

The disclosed network devices and associated methods offer a robust solution to control voltage surges by managing current consumption spikes, thereby enhancing the durability of network devices and their host systems.

System Description

FIG. 1 is a block diagram that schematically illustrates an Artificial Intelligence (AI) accelerator 20, in accordance with an embodiment of the present invention. Accelerator 20 comprises multiple Graphics Processing Units (GPUs) 24 connected to a packet switch 28. GPUS 24 are assigned to carry out various computational AI tasks, e.g., by an external host (not seen in the figure). Accelerator 20, and possibly the host, may be installed in a suitable server, for example. Any suitable number of GPUs, e.g., sixty-four GPUs, can be used.

When AI tasks begin and end processing, and particularly when multiple AI tasks begin or end simultaneously on multiple GPUs, the current consumption of switch 28 exhibits an abrupt change. The abrupt change in current consumption in turn creates a voltage surge on the voltage supplied to switch 28. Switch 28 mitigates such voltage surges using techniques that are described in detail herein.

The embodiments described herein refer mainly to an AI accelerator, to GPUs and to a switch, purely for the sake of conceptual clarity. The disclosed techniques, however, can be used in any other suitable system in which multiple processing devices communicate via a network device. AI accelerator 20 is thus considered a non-limiting example of a system, switch 28 is considered a non-limiting example of a network device, and GPUs 24 are considered a non-limiting example of processing devices. Examples of alternative configurations are use-cases are given below.

In the embodiment of FIG. 1, each GPU 24 comprises at least one port 32 (referred to herein as a "GPU port") for communicating with switch 28. Switch 28 comprises multiple ports 36 (referred to herein as "switch ports") for communicating with GPUs 24. GPUs 24 and switch 28 may communicate with one another via ports 32 and 36 using any suitable network protocol, such as InfiniBand™ or Ethernet. In some embodiments accelerator 20 further comprises a memory subsystem 44 connected to switch 28. GPUs 24 may use switch 28 to communicate with one another, and/or with memory subsystem 44.

Switch 28 further comprises a current monitor circuit 52 and a controller 48. Current monitor circuit 52 assesses current consumption values associated at least with switch 28, e.g., the current consumption of the entire switch, power consumptions of one or more selected ports, power consumption of accelerator 20 including the switch, and/or any other suitable power consumption values. Controller 48 uses the current consumption values to throttle the traffic bandwidth of one or more of switch ports 36 in order to reduce voltage surges. These techniques are described in detail below.

Current monitor circuit 52 and controller 48 are also referred to herein as "control circuitry" that carries out the disclosed techniques. The configuration of FIG. 1 is centralized, in the sense that all bandwidth throttling is performed by controller 48. An alternative, distributed configuration of the control circuitry is described further below.

Switch 28 is powered by a power supply 56. In some embodiments the same power supply is also used for powering GPUs 24. In other embodiments the GPUs are powered by a separate power supply. As explained above, the AI tasks assigned to GPUs 24 tend to be (i) intermittent (in the sense that they draw considerable current but for a limited duty-cycle) and (ii) synchronized between GPUs (i.e., tend to begin and/or end together, at least on some of the GPUs). This behavior may result in significant surges (overshoots and/or undershoots) in the voltage supplied to switch 28.

An illustrative example of a surge event is depicted on the right-hand side of FIG. 1. A plot 60 shows the current consumption of switch 28, on an arbitrary scale, as a function of time. As seen, the current is initially high. At a certain point in time the current consumption drops considerably due to multiple AI tasks ending together. In one severe scenario, the current consumption drops by more than 600 A within a period of less than 1 μsec.

A plot 64 shows the resulting voltage, on an arbitrary scale. As seen, the sudden drop in current consumption causes a momentary voltage surge, due to the above-described v=−Ldi/dt effect. Plots 60 and 64 show a voltage overshoot caused by a sudden decrease in current consumption. Similarly, a sudden increase in current consumption (e.g., caused by multiple AI tasks beginning together) will cause a momentary voltage undershoot.

Both overshoot and undershoot are regarded herein as voltage surges, and both are undesirable. In one severe scenario, the change (drop or rise) in current consumption causes a surge (overshoot or undershoot) of over 400 mV. A surge of this magnitude may exceed the ensured timing closure voltage of switch 28. A large overshoot may cause hold-time violations, whereas a large undershoot may cause setup-time violations. In addition, a voltage overshoot will typically increase the stress on switch components, and may therefore cause damage or degrade the switch reliability.

Mitigation of Voltage Surges by Limiting Bandwidth Slew-Rate

In some embodiments, controller 48 mitigates voltage surges by controlling the traffic slew-rate of the communication traffic via one or more of switch ports 36 to remain within a specified slew-rate range. The traffic slew-rates being considered typically pertain to the traffic entering switch 28, i.e., the traffic in the direction from GPUs 24 to the switch.

By ensuring that the slew-rates of the port bandwidths are within a specified slew-range rate, controller 48 ensures that the rate of change (rate of decrease, or rate of increase) in current consumption (di/dt) is below a specified rate. Consequently, the magnitude of the resulting voltage surge (overshoot or undershoot) is kept below a specified magnitude.

In one embodiment, controller 48 controls the traffic slew-rate (the rate of change in bandwidth as a function of time) of individual ports 36. In another embodiment, controller 48 controls the traffic slew-rate jointly for the entire switch 28, i.e., jointly over all ports 36. In yet other embodiments, controller 48 controls the traffic slew-rate for one or more groups of ports 36. For simplicity of explanation, the examples below refer mainly to a single port. The disclosed techniques, however, can be applied in a similar manner to a group of ports, to multiple groups of ports, or to all ports jointly.

Consider a certain port 36 of switch 28. In an embodiment, the bandwidth of the traffic entering switch 28 via the port is not permitted to change at a rate that exceeds a specified slew-rate threshold. Note that the threshold specifies the rate of change in bandwidth, not the absolute change in bandwidth. Thus, for example, an increase in traffic bandwidth from 500 Gbps to 800 Gbps (or a decrease in bandwidth from 800 Gbps to 500 Gbps) may permissible if occurring over 10 μsec, but forbidden if occurring over only 1 μsec. In some embodiments, different slew-rate thresholds may be set for the maximal rate of increase in bandwidth, and for the maximal rate of decrease in bandwidth.

In an embodiment, if the traffic bandwidth of the port increases too rapidly (e.g., more rapidly than the specified slew-rate threshold), controller 48 instructs the port to throttle-down incoming traffic. The port may throttle-down the incoming traffic in various ways. For example, the port may buffer incoming packets, and release them to the processing circuitry at a lower rate. As another example, switch 28 and GPUs 24 may use a certain flow-control mechanism, e.g., a PAUSE/RESUME or credit-based mechanism, which allows switch port 36 to throttle-down the traffic arriving from the corresponding GPU port 32. Throttling-down the incoming traffic spreads the increase in bandwidth over a longer time period, and therefore reduces the magnitude of a possible voltage surge.

In an embodiment, if the traffic bandwidth of the port decreases too rapidly (e.g., more rapidly than the specified slew-rate threshold), controller 48 may control the port to inject dummy traffic so as to throttle-up the bandwidth. Injection of dummy traffic spreads the decrease in bandwidth over a longer time period, and therefore again reduces the magnitude of a possible voltage surge.

In various embodiments, controller 48 may control ports 36 using any suitable interface. In one example, the interface supports an "up-throttle" message instructing the port to inject dummy traffic, a "down-throttle" message instructing the port to throttle-down (e.g., buffer) the port traffic, and a "clear" message instructing the port to stop taking any of the above actions.

Figure 2:
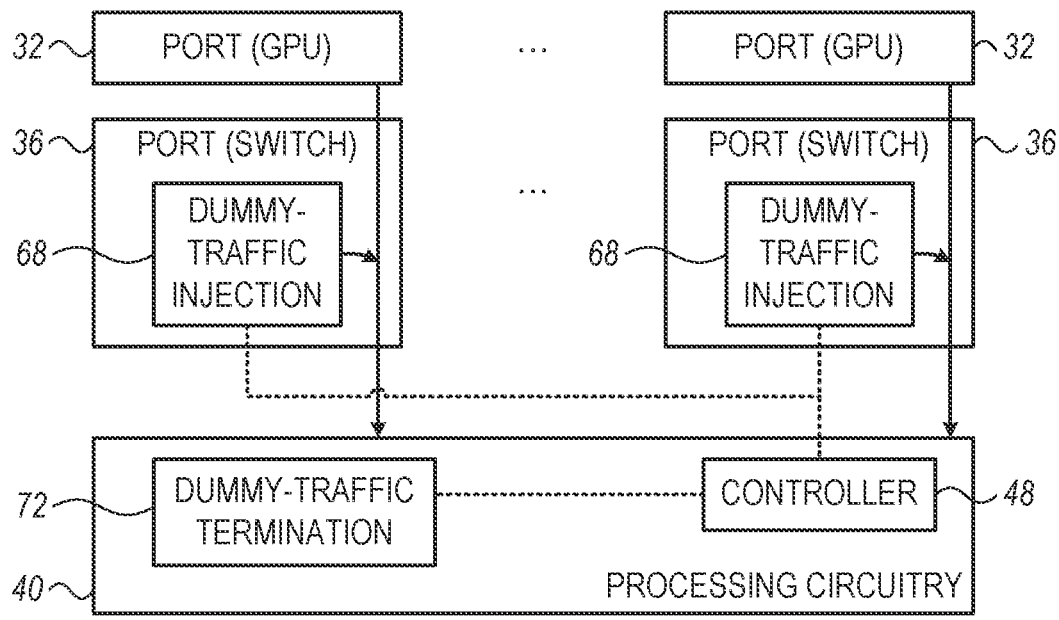
FIG. 2 is a block diagram that schematically illustrates selected details of the accelerator of FIG. 1, focusing on injection of dummy traffic, in accordance with an embodiment of the present invention; and chart

FIG. 2 is a block diagram that schematically illustrates selected details of accelerator 20, focusing on injection of dummy traffic, in accordance with an embodiment of the present invention. In the present example, each switch port 36 comprises a respective injection circuit 68. When instructed by controller 48, a given injection circuit 68 injects dummy traffic at a specified rate to the port. Typically, injection circuit 68 of a given switch port 36 injects dummy traffic by generating dummy packets and inserting them between packets that arrive from GPU port 32.

In the example of FIG. 2, the injection process is internal to switch 28, i.e., performed in switch ports 36. In these embodiments, no cooperation or modification is needed in GPUs 24 for implementing the dummy-traffic injection mechanism. In an alternative embodiment, injection of dummy traffic may be performed in GPU ports 32 or elsewhere in GPUs 24.

In an embodiment, processing circuitry 40 of switch 28 comprises a dummy-traffic termination circuit, which intercepts and discards the dummy traffic arriving from ports 36.

The configuration of accelerator 20, and the internal configuration of switch 28, as shown in FIGS. 1 and 2, are example configurations that are depicted purely for the sake of conceptual clarity. Any other suitable configurations can be used in alternative embodiments. For example, other types of network devices, e.g., a Top-of-Rack (ToR) switch, a router or a bridge, can be used. As another example, any other suitable processing devices, such as Central Processing Units (CPUs) or Field-Programmable Gate Arrays (FPGAs), can be used in alternative embodiments. The processing devices (GPUs or otherwise) may be deployed to carry out any other suitable tasks, not necessarily relating to AI as in the examples herein.

As another example, in the example of FIGS. 1 and 2 the control circuitry of switch 28 is centralized. In alternative embodiments, the solution is distributed among switch ports 36. In an example embodiment, each switch port 36 runs a self-contained, closed-loop process that maintains the bandwidth slew-rate of the port within a defined range. For example, each port may comprise a respective port-specific controller that checks the rate of increase or decrease in the traffic bandwidth of the port. The port-specific controller throttles-down the port traffic as needed to ensure the bandwidth does not increase too rapidly, and injects dummy traffic as needed to ensure the bandwidth does not decrease too rapidly. In alternative embodiments, a distributed solution of this sort may be implemented in a subset of the ports. Further alternatively, a dedicated controller may be assigned to a group of ports, as opposed to an individual port.

As yet another example, in some embodiments controller 48 decides whether to control the traffic slew-rate (of a port, of a group of ports or of the entire switch) not only based on the rate-of-change in the bandwidth (of the port, group of ports or entire switch) but also based on the absolute bandwidth value (of the port, group of ports or entire switch).

Elements that are not mandatory for understanding of the disclosed techniques have been omitted from the figures for the sake of clarity. The various elements of systems 20 and 104, and the elements of their components, e.g., packet reordering device 36, shown in FIGS. 1 and 4, may be implemented using software, using suitable hardware such as in one or more Application-Specific Integrated Circuits (ASICs) or Field-Programmable Gate Arrays (FPGAs), or using a combination of software and hardware elements.

In some embodiments, certain functions of switch 28, e.g., some or all functions of controller 48, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 3:
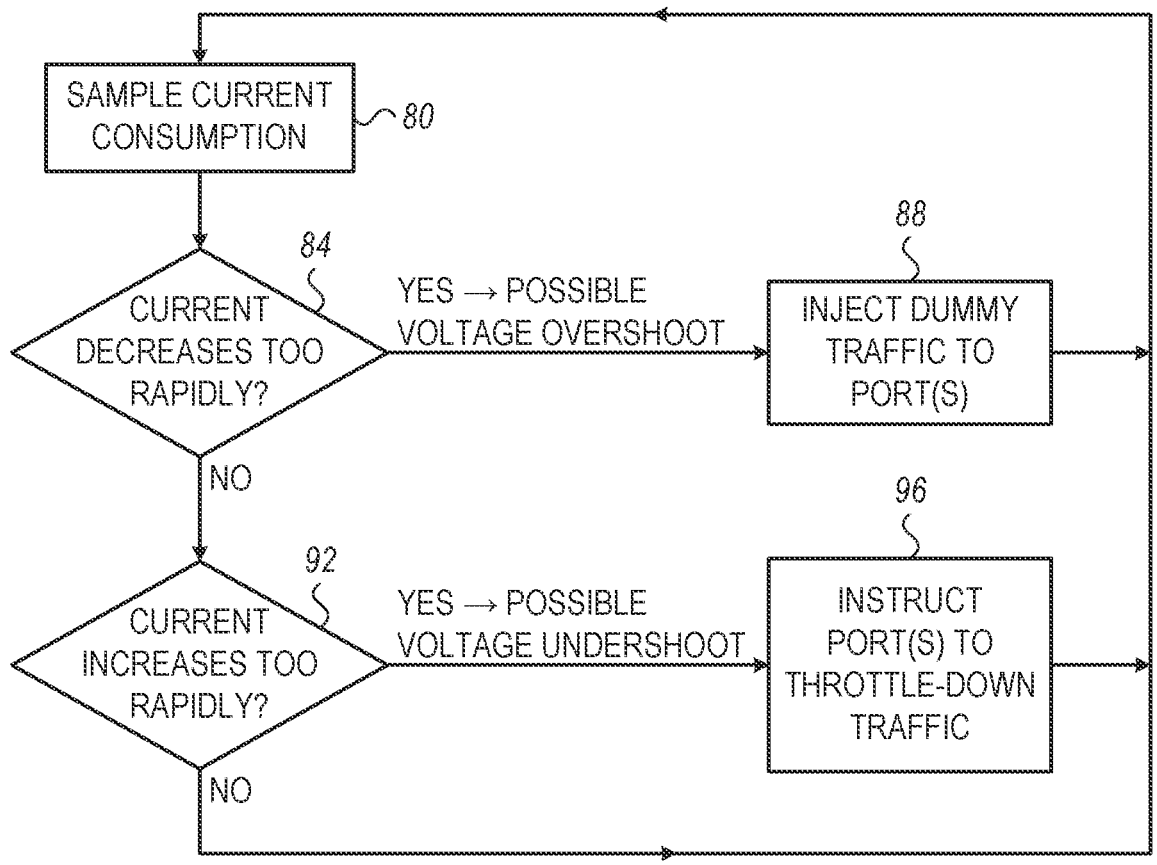
FIG. 3 is a flow that schematically illustrates a method for mitigating voltage surges, in accordance with an embodiment of the present invention.

FIG. 3 is a flow chart that schematically illustrates a method for mitigating voltage surges, in accordance with an embodiment of the present invention. The method begins with current monitor circuit 52 of switch 28 sampling the current consumption of switch 28, at a current monitoring stage 80.

At a decrease-rate checking stage 84, controller 48 of switch 28 checks whether the current consumption of switch 28 decreases too rapidly (e.g., more rapidly than a defined threshold). If so, controller 48 concludes that a voltage overshoot surge is possible. In response, controller 48 instructs one or more of switch ports 36 to inject dummy traffic into the traffic they receive from GPU ports 32, at an injection stage 88. The method then loops back to stage 80 above.

If the outcome of decrease-rate checking stage 84 is negative, controller 48 proceeds to an increase-rate checking stage 92, in which the controller checks whether the current consumption of switch 28 increases too rapidly (e.g., more rapidly than a defined threshold). If so, controller 48 concludes that a voltage undershoot surge is possible. In response, controller 48 instructs one or more of switch ports 36 to throttle-down the traffic they receive from GPU ports 32, at a down-throttling stage 96. The method then loops back to stage 80 above.

If the outcome of increase-rate checking stage 92 is negative, the method again loops back to stage 80.

The method flow of FIG. 3 is an example flow that is chosen for the sake of conceptual clarity. In alternative embodiments, the disclosed techniques can be implemented using any other suitable method.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
a plurality of ports, to receive communication traffic from a plurality of processing devices;
processing circuitry, to process the communication traffic received via the ports; and
control circuitry, to:
assess one or more electrical-current consumption values associated with at least the network device; and
depending on the electrical-current consumption values, control a traffic slew-rate of the communication traffic of at least a port among the ports to remain within a specified slew-rate range, the traffic slew-rate being defined as a rate at which a bandwidth of the communication traffic received via the port changes as a function of time.

2. The network device according to claim 1, wherein the control circuitry is to control the traffic slew-rate to remain within the specified slew-rate range, by:
detecting that the bandwidth of the communication traffic increases more rapidly than a specified traffic slew-rate threshold; and
in response, controlling the port to throttle-down the bandwidth.

3. The network device according to claim 1, wherein the control circuitry is to control the traffic slew-rate to remain within the specified slew-rate range, by:
detecting that the bandwidth of the communication traffic decreases more rapidly than a specified traffic slew-rate threshold; and
in response, controlling the port to inject dummy traffic so as to throttle-up the bandwidth.

4. The network device according to claim 3, further comprising a traffic termination circuit, to receive and discard the dummy traffic.

5. The network device according to claim 1, wherein the at least one port comprises multiple ports, and wherein the control circuitry comprises a centralized controller that is to control respective traffic slew-rates of the multiple ports.

6. The network device according to claim 1, wherein the at least one port comprises multiple ports, and wherein the control circuitry comprises multiple port-specific controllers associated with the multiple ports, respectively, each port-specific controller to control the traffic slew-rate of the respective port.

7. A system, comprising:
a plurality of processing devices; and
a network device, comprising:
a plurality of ports, to receive communication traffic from the processing devices;
processing circuitry, to process the communication traffic received via the ports; and
control circuitry, to:
assess one or more electrical-current consumption values associated with at least the network device; and
depending on the electrical-current consumption values, control a traffic slew-rate of the communication traffic of at least a port among the ports to remain within a specified slew-rate range, the traffic slew-rate being defined as a rate at which a bandwidth of the communication traffic received via the port changes as a function of time.

8. The system according to claim 7, wherein the processing devices comprise at least one device type selected from a group of types consisting of a Graphics Processing Unit (GPU), a Central Processing Unit (CPU) and a Field-Programmable Gate Array (FPGA).

9. The system according to claim 7, wherein the control circuitry is to control the traffic slew-rate to remain within the specified slew-rate range, by:
   detecting that the bandwidth of the communication traffic increases more rapidly than a specified traffic slew-rate threshold; and
   in response, controlling the port to throttle-down the bandwidth.

10. The system according to claim 7, wherein the control circuitry is to control the traffic slew-rate to remain within the specified slew-rate range, by:
    detecting that the bandwidth of the communication traffic decreases more rapidly than a specified traffic slew-rate threshold; and
    in response, controlling the port to inject dummy traffic so as to throttle-up the bandwidth.

11. The system according to claim 10, further comprising a traffic termination circuit, to receive and discard the dummy traffic.

12. The system according to claim 7, wherein the at least one port comprises multiple ports, and wherein the control circuitry comprises a centralized controller that is to control respective traffic slew-rates of the multiple ports.

13. The system according to claim 7, wherein the at least one port comprises multiple ports, and wherein the control circuitry comprises multiple port-specific controllers associated with the multiple ports, respectively, each port-specific controller to control the traffic slew-rate of the respective port.

14. A method, comprising:
    in a network device, receiving communication traffic from a plurality of processing devices via a plurality of ports, and processing the received communication traffic;
    assessing one or more electrical-current consumption values associated with at least the network device; and
    depending on the electrical-current consumption values, controlling traffic of a slew-rate the communication traffic of at least a port among the ports to remain within a specified slew-rate range, the traffic slew-rate being defined as a rate at which a bandwidth of the communication traffic received via the port changes as a function of time.

15. The method according to claim 14, wherein the processing devices comprise at least one device type selected from a group of types consisting of a Graphics Processing Unit (GPU), a Central Processing Unit (CPU) and a Field-Programmable Gate Array (FPGA).

16. The method according to claim 14, wherein controlling the traffic slew-rate to remain within the specified slew-rate range comprises:
    detecting that the bandwidth of the communication traffic increases more rapidly than a specified traffic slew-rate threshold; and
    in response, controlling the port to throttle-down the bandwidth.

17. The method according to claim 14, wherein controlling the traffic slew-rate to remain within the specified slew-rate range comprises:
    detecting that the bandwidth of the communication traffic decreases more rapidly than a specified traffic slew-rate threshold; and
    in response, controlling the port to inject dummy traffic so as to throttle-up the bandwidth.

18. The method according to claim 17, further comprising discarding the dummy traffic in the network device.

19. The method according to claim 14, wherein the at least one port comprises multiple ports, and wherein controlling the traffic slew-rate comprises controlling respective traffic slew-rates of the multiple ports using a centralized controller.

20. The method according to claim 14, wherein the at least one port comprises multiple ports, and wherein controlling the traffic slew-rate comprises controlling the traffic slew-rate of each port using a respective port-specific controller associated with the port.

* * * * *